United States Patent [19]
Shin et al.

[11] Patent Number: 5,383,186
[45] Date of Patent: Jan. 17, 1995

[54] APPARATUS AND METHOD FOR SYNCHRONOUS TRAFFIC BANDWIDTH ON A TOKEN RING NETWORK

[75] Inventors: Kang G. Shin; Qin Zheng, both of Ann Arbor, Mich.

[73] Assignee: The Regents of the University of Michigan, Ann Arbor, Mich.

[21] Appl. No.: 57,112

[22] Filed: May 4, 1993

[51] Int. Cl.$^6$ ............................................. H04L 12/42
[52] U.S. Cl. ........................... 370/85.5; 370/85.15
[58] Field of Search ............... 370/60, 60.1, 85.4, 370/85.5, 85.15, 94.1, 94.2; 390/825.05

[56] References Cited
U.S. PATENT DOCUMENTS

| | | | |
|---|---|---|---|
| 5,068,849 | 11/1991 | Tanaka | 370/85.5 |
| 5,191,580 | 3/1993 | Nakano et al. | 370/85.5 |
| 5,245,605 | 9/1993 | Ofek | 370/85.5 |

OTHER PUBLICATIONS

ANSI, Station Management Protocol (SMT) of ANSI, Document X3T9/92-067, Jun. 25, 1992.
ANSI, Fiber Distributed Data Interface (FDDI)—Token Ring Media Access Control (MAC), Document X3.139-1987, Jan. 1, 1987.
Weaver, Alfred C.; Local Area Networks and Busses—An Analysis; Flight Data Systems, NASA, Johnson Space Center; pp. 152–156; (1986).

*Primary Examiner*—Wellington Chin
*Attorney, Agent, or Firm*—Harness, Dickey & Pierce

[57] ABSTRACT

A method and apparatus for improved data communications over a token ring interface in which a target token rotation time value is a function of an initial target token rotation time value, the summation of the high priority token holding times for each node on the ring, and the time required to transmit a maximum size packet. Furthermore, the target rotation timer for the token ring network is activated only when the node is not transmitting in a synchronous manner.

4 Claims, 2 Drawing Sheets

APPARATUS AND METHOD FOR SYNCHRONOUS TRAFFIC BANDWIDTH ON A TOKEN RING NETWORK

This invention was made with Government support under Grant Numbers N00014-92-J-1080 awarded by the Office of Naval Research and MIP-9203895 awarded by the National Science Foundation. The Government has certain rights in the invention.

This invention relates to a token ring network in which the synchronous traffic bandwidth of the network is substantially increased.

BACKGROUND OF THE INVENTION

With the proliferation of small and medium sized personal computers located at a number of physically separated sites and used by a number of different users, there is also an accompanying need and desire to interface the individual computer sites into a large network in order to facilitate communications between and amongst each network site. As the number of sites in a network grows and the physical separation distance between networked sites grows, it is important to provide a network which will enable communication at a relatively high rate of speed in order to accommodate a large number of computers interconnected in one network.

One such large network is a token ring. In a token ring configuration, a number of local sites are serially connected by a transmission medium to form a closed loop. Information is then transmitted sequentially, as a stream of data called a message, from one active station to the next. Each station generally regenerates and repeats each message and serves as the means for attaching one or more devices to the ring for the purpose of communicating with other devices on the ring. A given site that has access to the transmission medium transmits information onto the ring, where the information then circulates from one station to the next. The information is accompanied by an address which designates the destination site to receive the message. The addressed destination site copies the information as it passes. The message travels around the serially interconnected stations and is finally returned to the initial source site which then removes the transmitted information from the ring.

A site gains the right to transmit its information onto the medium when it detects and captures token passing on the medium. The token is a control signal comprised of a unique symbol sequence that circulates on the medium in addition to transmitted data. After the detection of a token, the site detecting the token may remove the token from the ring. That site may then transmit one or more frames of information, and at the completion of its data transmission, issues a new token which provides other sites the opportunity to gain access to the ring. The length of time in which a site may occupy the medium before passing the token is controlled by a token-holding timer.

In addition to ring access being arbitrated by a token, multiple levels of priority are available for independent and dynamic assignment ring bandwidth, depending upon the relative class of service required. The classes of service are synchronous, asynchronous, or immediate service. For all classes of service, the allocation of a finite ring bandwidth occurs by mutual agreement among the users of the ring. The finite bandwidth is primarily divided into the formentioned classes as defined above into synchronous and asynchronous portions. Asynchronous communication defines a class of data transmission service in which all requests for service contend for a pool of dynamically allocated ring bandwidth and response time. Synchronous communication defines a class of data transmission service in which each requester is preallocated a maximum bandwidth and guaranteed a response time not to exceed a specific delay. Immediate data transmission is generally used only for extraordinary applications such as ring recovery.

When a number of network sites are distributed over distances of several miles, the transmission medium over which that data is transmitted becomes of much greater importance. One such transmission medium over which a number of network stations may be interconnected is a fiber optic medium. In a fiber optic medium, optical signals from light-generating transmitters are propagated through optical fiber wave-guides to light-detecting receivers. The above named classes of data transmission are implemented in a standardized fiber optic network defined as a fiber distributed data interface (FDDI). The FDDI generally consists of a number of layers: a physical layer, which defines the physical requirements of the data interface; a data layer, which defines fair and deterministic access to the medium as well as a common protocol to ensure data integrity; and a station management layer, which defines the control necessary at the station level to manage the processes underway in the various FDDI layers. This invention is directed at an improvement in the data link layer. More specifically, this improvement is directed toward the media access control (MAC) which provides access to the medium and verification of transmission sequences. The information as described above including a definition of the MAC may be found in a document entitled *Fiber Distributed Data Interface (FDDI)—Token Ring Media Access Control (MAC)*, American National Standards Institute (ANSI) document number ANSI X3.139-1987, and is herein incorporated by reference.

Using synchronous channels, an FDDI network provides both bounded transmission delays and a guaranteed bandwidth for the synchronous traffic. The FDDI standard is designed for a 100 Mbps token ring network implemented on a fiber optic medium. Because of its high speed, FDDI alleviates the bandwidth saturation problem of current slower ethernet and token ring systems. Furthermore, the synchronous traffic support capability of FDDI also makes it ideal for supporting multi-media applications which integrate the transmissions of ordinary data and digital voice and video signals. Using synchronous channels, a FDDI network provides both bounded transmission delays and a guaranteed bandwidth for synchronous traffic. The transmission delay is controlled by a target token rotation timer (TTRT) which guarantees each node will have an opportunity to transmit synchronous messages at least once within a predetermined time period. It also ensures that the average time between consecutive opportunities to transmit does not exceed the TTRT value. Once a node has access to the network, the bandwidth of synchronous traffic that that particular node may transmit is guaranteed by assigning to that node a portion of the TTRT value for the entire token ring, called the high priority token holding time for node i, Hi. This yields a guaranteed bandwidth for a node in which to transmit synchronous messages. However, a node usually can not fully utilize the guaranteed bandwidth due to the transmission delay requirement of synchronous messages. This invention is directed at a method of improving the allowable bandwidth in which to transmit synchronous messages.

SUMMARY OF THE INVENTION

A method and apparatus for improved data communications over a token ring interface implemented via a fiber optic medium in which a target token rotation timer value is a function of an initial target token rotation timer value, the summation of the high priority token holding times for each node on the ring, and the time required to transmit a maximum size packet. Furthermore, the target rotation timer for the token ring network is activated only when the node is transmitting in a synchronous manner.

Further objects, features and advantages of the invention will become apparent from a consideration of the following description and the appended claims when taken in connection with the accompanying drawings.

DETAILED DESCRIPTION OF THE DRAWINGS

Figure 3:
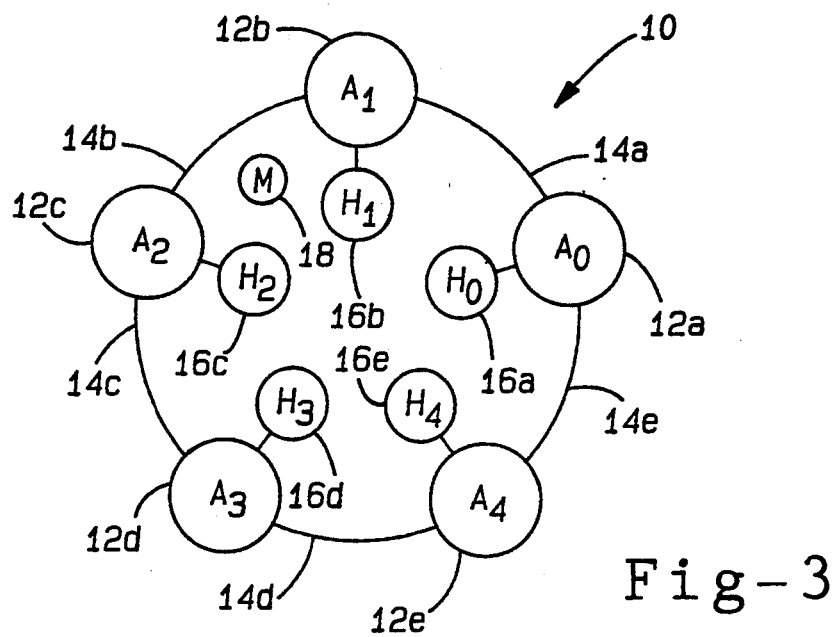
FIG. 3 depicts a block diagram of a token ring network.
Figure 4:
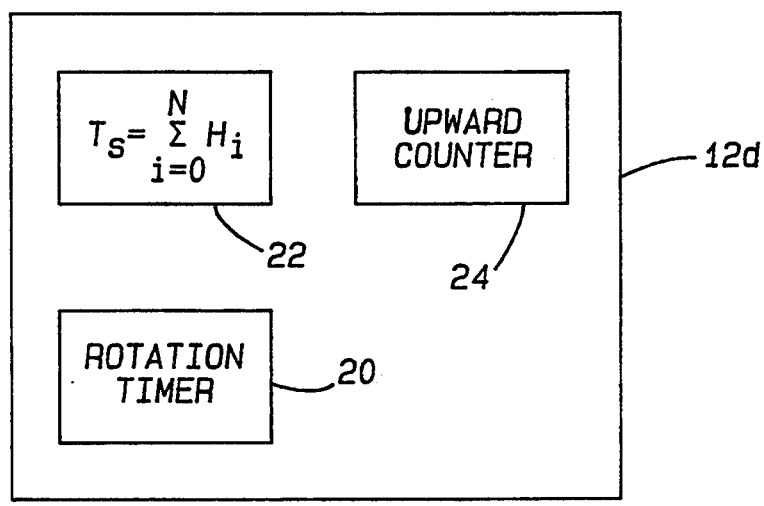
FIG. 4 depicts a block diagram of an arbitrating node of the token ring network depicted in FIG. 3.

FIG. 3 depicts a token ring network 10. The token ring network comprises a number of nodes 12a–12e having addresses $A_0$–$A_4$, respectively. The nodes are interconnected into a ring network by data busses 14a–14e as shown in FIG. 3. The data busses transmit various information, depicted in FIG. 3 as message 18. Further, with each node is associated a minimum transmit time $H_0$–$H_1$ referred to by reference numerals 16a–16e, respectively. In a typical token ring network, one of the nodes is chosen as an administrator node for arbitrating access to the token ring by any of the nodes $A_0$–$A_4$. Merely by way of example, FIG. 4 depicts a partial block diagram of an administrative node, which is chosen arbitrarily for this discussion as node 12d. Node 12d includes a rotation timer 20, an apparatus for determining the total of the minimum amounts of synchronous traffic transmission time 22 and an upward counter 24, all to be explained further herein.

In order to fully describe this invention it is first necessary to briefly outline the operation of the fiber distributed data interface (FDDI) as embodied in the American National Standards Institute (ANSI) standard. As described in the background portion of the specification presented herein, an FDDI network provides both bounded transmission delays and a guaranteed bandwidth for synchronous traffic. The transmission delay is controlled by a target token rotation time (TTRT) of a ring, which implies that each node will have an opportunity to transmit its synchronous messages at least every $2 \times TTRT$ units of time and also implies that the average transmission delay does not exceed TTRT. The bandwidth of synchronous traffic that may be transmitted by a node i is guaranteed by assignment to that node a portion of the TTRT, called the high priority token holding time, Hi. That is, node i is allowed to transmit synchronous messages once it receives the token for a time period up to Hi. Because the average rotation token time does not exceed TTRT, node i is guaranteed a bandwidth of (Hi/TTRT)×100 Mbps to transmit its synchronous messages. However, due to the transmission delay requirement of synchronous messages, a node can not fully utilize the guaranteed bandwidth. This could lead to some messages experiencing larger transmission delays than the prespecified bound. There are two primary reasons for this situation.

The first such reason is due to a deficiency in the FDDI's token passing protocol. Synchronous messages are usually generated periodically, and each message is required to be transmitted before the generation of the next one. For example, for a message generation period T and a message transmit time C, the maximum token rotation time is $2 \times TTRT$ so that TTRT must be set to a value no larger than T/2 to ensure that a node receives the token at least once every T units of time. In order to allow a node sufficient time to transmit one message after receiving the token, the high priority holding time Hi of the node must be set to a value greater than or equal to C. This guarantees a synchronous transmission bandwidth of $2C/T \times 100$ Mbps while in actuality only half the guaranteed bandwidth is used, which results in an actual bandwidth to transmit synchronous messages of $C/T \times 100$ Mbps. Thus, the difference between the maximum token rotation time $2 \times TTRT$ and the average token rotation time TTRT results in a significant reduction in the ability of FDDI to handle synchronous traffic.

The second reason for less than full utilization of the guaranteed bandwidth results from the inconsistent generation of synchronous messages. Because the size of synchronous messages may vary, in order to allow a node sufficient time to transmit a maximum-size message upon receiving the token, the high priority time Hi of the node must be set to a value no smaller than the maximum transmission time, Cmax. For a synchronous message, this results in a guaranteed bandwidth of $2Cmax/T \times 100$ Mbps. Whereas, given the average size of a synchronous message, Cave, the average guaranteed signal bandwidth is $Cave/T \times 100$ Mbps. This implies that the guaranteed bandwidth is 2Cmax/Cave times that of the average single bandwidth.

In order to more fully explain the existing FDDI standard, the pertinent sections of the FDDI MAC protocol will be explained below. Assume there are N nodes O to N-1 in a token ring. Access to the ring by a node is then controlled by the following protocol.

P1: As part of an FDDI ring initialization process, each node declares a target token rotation time (TTRT) equal to one half of the requested transmission delay bound of its synchronous messages. The lowest TTRT value is then selected as the TTRT for the token ring. Each node which supports synchronous traffic is then assigned a portion of TTRT to transmit is synchronous messages. That portion of TTRT that a node i is assigned to transmit its synchronous messages is defined as Hi.

P2: For each node there are two timers: the token-rotation-timer (TRT) and the token-holding-timer (THT). The TRT always counts up, and THT counts up only when that node transmits asynchronous packets. If TRT reaches TTRT before the token arrives at the node, TRT is reset to 0 and the token is marked as late by incrementing the node's late count Lc by one. To initialize the timers at different nodes, no packets are allowed to be transmitted during the first token rotation after the ring initialization and Lc's are set to 0.

P3: The node which has the token is the only node eligible to transmit packets. The packet transmission time is controlled by the timers, but an in-progress packet transmission will not be interrupted until its completion. When a node i receives the token, it does the following:

P3.1: If Lc>0, then set Lc:=Lc−1 and THT:=TTRT, else set THT:=TRT and TRT:=0.

P3.2: If node i has synchronous packets, those packets are transmitted for a time period less than or equal to Hi or until all the synchronous packets are transmitted, whichever occurs first.

P3.3: If a node i has asynchronous packets, it transmits them until the value of THT equals TTRT or all of its asynchronous packets are transmitted, whichever occurs first.

P3.4: Node i passes the token to the next node ((i+1) mod N).

As discussed above, there are two factors which reduce the ability of FDDI to support synchronous traffic: (1) the difference between the maximum TTRT and the achievable average TTRT, and (2) uneven generation of synchronous messages. Since a network protocol cannot change the generation pattern of messages, this invention optimizes the difference between the maximum TTRT and the average TTRT.

To that end, an improvement to the FDDI standard may be implemented as follows. The ring latency Tring is defined as the time needed to circulate the token around the token ring once without transmitting any packets, and Tp is defined as the time needed to transmit a maximum-size packet. Then, if $$\sum_{i=0}^{N-1} Hi \leq TTRT - Tring - Tp,$$

the worst-case and average token rotation times will not exceed 2×TTRT and TTRT, respectively. As previously mentioned above, this difference between the worst-case and average token rotation time significantly reduces the synchronous traffic support capacity of FDDI. This invention seeks to limit the worst-case token rotation time to a value less than or equal to TTRT. If this can be realized, the TTRT can be set to be the message generation period T instead of T/2, and twice as many synchronous connections and thus synchronous traffic can be established in an FDDI network.

The token rotation time is composed of three components of time. The components are apportioned to the transmission of synchronous packets, asynchronous packets, and the ring latency Tring. During one token rotation, the time during which the transmission of synchronous packets occurs is bounded by $$Ts = \sum_{i=0}^{N-1} Hi.$$

Therefore, if we can limit the time used for the transmission of asynchronous packets to a value less than or equal to Ta=TTRT−Ts−Tring, the maximum token rotation time will not exceed the TTRT. This improvement may be achieved by making the following two modifications to the standard FDDI MAC protocol.

Figure 1:
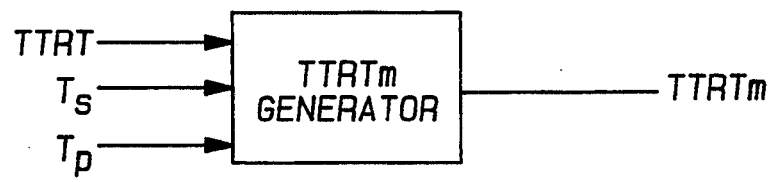
FIG. 1 is a block diagram depicting a circuit for developing the modified target token rotation time (TTRTm) as embodied in this invention.

Modification 1: referring to FIG. 1, a modified token rotation time TTRTm:=TTRT−Ts−Tp may be employed rather than the TTRT.

Figure 2:
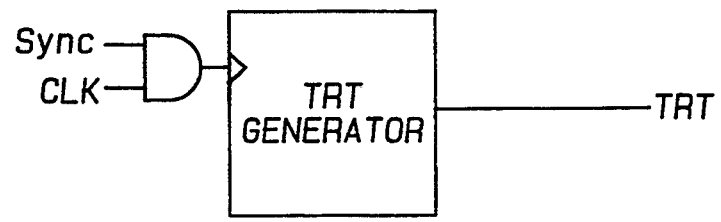
FIG. 2 is a block diagram depicting a circuit to inhibit the token rotation timer (TRT) according to one embodiment this invention.

Modification 2, referring to FIG. 2, inhibit the operation of the token timer TRT for a node when that node transmits or forwards asynchronous packets.

Incorporating these modifications in the FDDI-MAC standard yields the following protocol defined as FDDI-M.

P1: As part of an FDDI-M ring initialization process, each node declares a TTRT equal to the requested transmission delay bound of its synchronous messages. The lowest TTRT value is then selected as the TTRT for the ring. Each node which supports synchronous traffic is then assigned a portion of TTRT to transmit its synchronous packets. That portion of TTRT for a node i assigned to transmit its synchronous messages is defined as Hi. This yields a modification target token rotation time $$TTRTm: = TTRT - \sum_{i=0}^{N-1} Hi - Tp,$$

where Tp is the time needed to transmit a maximum-size packet.

P2: For each node there are two timers, the token-rotation-timer (TRT) and the toke-holding-timer (THT). The THT for each node counts up when that node transmits an asynchronous packet, and the TRT for each node counts up when the node is not transmitting/forwarding a synchronous packet. To initialize the timers at different nodes, no packets are allowed to be transmitted during the first token rotation after the ring initialization.

P3: The node which has the token is the only eligible node to transmit packets. The packet transmission time is controlled by the timers, but an in-progress packet transmission will not be interrupted. When a node i receives the token, it does the following:

P3.1 THT:=TRT; TRT:=0.

P3.2 If node i has synchronous packets prepared for transmission, it transmits them for a time period up to Hi or until all the synchronous packets are transmitted, whichever occurs first.

P3.3 If node i has asynchronous packets prepared for transmission, it transmits them until the THT counts up to the TTRTm or all the asynchronous packets are transmitted, whichever occurs first.

P3.4 Node i passes the token to the next node ((i+1) rood N).

These modifications enable the token holding timer at each node to ensure that the time used by that node for transmitting synchronous packets plus the time used by that node for transmitting asynchronous packets during the last tokens rotation will not exceed Ta=TTRTm+Tp−Tring=TTRT−Ts−Tring so long as Ts equals $$\sum_{i=0}^{N-1} Hi$$

is less than TTRT−Tring. Thus, the maximum token rotation time will always be less than Ta+Ts+-

Tring=TTRT. This in effect doubles the capacity of the token ring to support the synchronous traffic.

This invention has the further benefit of improving the ability of a token ring to support asynchronous traffic because less of the token ring bandwidth is allocated to the passing of the token. That is, for a given synchronous throughput, the larger an average token rotation time that a protocol may achieve, the more asynchronous traffic it can support. Furthermore, with respect to asynchronous traffic, the FDDI-M is as fair as FDDI in transmitting asynchronous messages. All nodes receive an approximately identical average asynchronous throughput.

This approach for an improved method and apparatus for handling synchronous traffic may be generalized to the case where a synchronous message need not be transmitted before the generation of the next message. That is, a synchronous message delay bound D may exceed the message generation period T.

It is to be understood that the invention is not limited to the exact construction illustrated and described above, but that various changes and modifications may be made without departing from the spirit and scope of the invention as defined in the following claims.

We claim:

1. A data communications network interface comprising:
   a plurality of network nodes each having an address and being interconnected in order to enable communications between one network node of the plurality and at least one other network node of the plurality by addressing a message to the other network node;
   a token ring network comprising the plurality of network nodes that serially interconnects the plurality of network nodes to enable transmission of data between the plurality of nodes;
   means for arbitrating access to the token ring network by each of the plurality of network nodes so that a token is serially passed to each of the plurality of network nodes and a node is granted access to the token ring network upon receipt of the token, the arbitration means defining a predetermined response time to a request for access and a predetermined access time upon a grant of access to the network to define synchronous communications, the arbitration means further guaranteeing an opportunity to transmit synchronous communications traffic at least once every predetermined time interval as determined in accordance with a target token rotation time TTRT;
   a plurality of timer means operatively associated with each node to define a minimum time period during which each of the plurality of network nodes may transmit synchronous traffic, where the summation of the minimum amounts defines a synchronous traffic transmission time Ts;
   a rotation timer operatively associated with the arbitration means to define a time interval within which the token must pass to each of the network nodes to define a modified target token rotation time TTRTm, the time interval being a function of a maximum message-size transmit time Tp, the synchronous traffic transmission time Ts, and the target token rotation time TTRT, such that TTRTm=TTRT−Ts−Tp; and
   an upward counter which resets to zero upon reaching TTRT and is inhibited upon the transmission of a synchronous message.

2. A method of data communications network interfacing, comprising:
   interconnecting a plurality of network nodes, each having an address, in order to enable communications between one network node of the plurality and at least one other network node of the plurality by addressing a message to the other network node;
   interconnecting the plurality of network nodes in a token ring network configuration that serially links the plurality of network nodes to enable transmission of data between the plurality of nodes;
   arbitrating access to the token ring network by each of the plurality of network nodes so that a token is serially passed to each of the plurality of network nodes and a node is granted access to token ring network upon receipt of the token, the arbitration means including a predetermined response time to a request for access and a predetermined access time upon a grant of access to the network to define synchronous communications, the arbitration means guaranteeing an opportunity to transmit synchronous communications traffic at least once every predetermined time interval as determined in accordance with a target token rotation time TTRT;
   determining a minimum time period during which each of the plurality of network nodes may transmit synchronous traffic, where the summation of the minimum amounts defines a synchronous traffic transmission time Ts;
   defining a time interval within which the token must pass to each of the network nodes to define a modified target token rotation time TTRTm, the time interval being a function of a maximum message-size transmit time Tp, the synchronous traffic transmission time Ts, and the target token rotation time TTRT, such that TTRTm=TTRT−Ts−Tp; and
   inhibiting the activation of an upward counter upon the transmission of a synchronous message and resetting the upward counter upon the counter being substantially equal to TTRT.

3. In an American National Standard for Information Systems (ANSI) standard for fiber distributed data interface (FDDI)—token ring media access control (MAC), ANSI X3.139-1987, in which a fiber optics communications protocol is designed to be effective at a predetermined speed over a token ring architecture employing a fiber optic medium as a transmission medium including a time interval during which a network node is guaranteed an opportunity to transmit synchronous communications traffic at least once defined as a target token rotation time TTRT, a plurality of timer means for providing a minimum time period during which each network node may transmit synchronous traffic, where the summation of the minimum time periods defines a synchronous traffic transmission time Ts, a timer determines a time interval required to transmit the maximum size message defined as transmit time Tp, an improvement, comprising:
   a modified target token rotation timer to provide a modified target token rotation time TTRMm wherein the modified target token rotation time is determined in accordance with the time period required for transmission of synchronous packets Ts, the time interval required to transmit a maximum-size packet Tp, and the target token rotation time TTRT, such that TTRTm=TTRT−Ts−Tp; and means for inhibiting counting of a token rotation time TRT associated with a node when the node is transmitting a synchronous packet.

4. In an American National Standard for Information Systems (ANSI) standard for fiber distributed data interface (FDDI)—station management (SMT), ANSI X3T9/92-067, in which a fiber optics communications protocol is designed to be effective at a predetermined speed over a token ring architecture employing a fiber optic medium as a transmission medium including a time interval during which a network node is guaranteed an opportunity to transmit synchronous communications traffic at least once defined as a target token rotation time TTRT, a plurality of timer means for providing a minimum time period during which each network node may transmit synchronous traffic, where the summation of the minimum time periods defines a synchronous traffic transmission time Ts, a timer determines a time interval required to transmit the maximum size message defined as transmit time Tp, an improvement, comprising:

a modified target token rotation timer to provide a modified target token rotation time TTRMm wherein the modified target token rotation time is determined in accordance with the time period required for transmission of synchronous packets Ts, the time interval required to transmit a maximum-size packet Tp, and the target token rotation time TTRT, such that TTRTm=TTRT−Ts−Tp; and means for inhibiting counting of a token rotation time TRT associated with a node when the node is transmitting a synchronous packet.

* * * * *